UNITED STATES PATENT OFFICE.

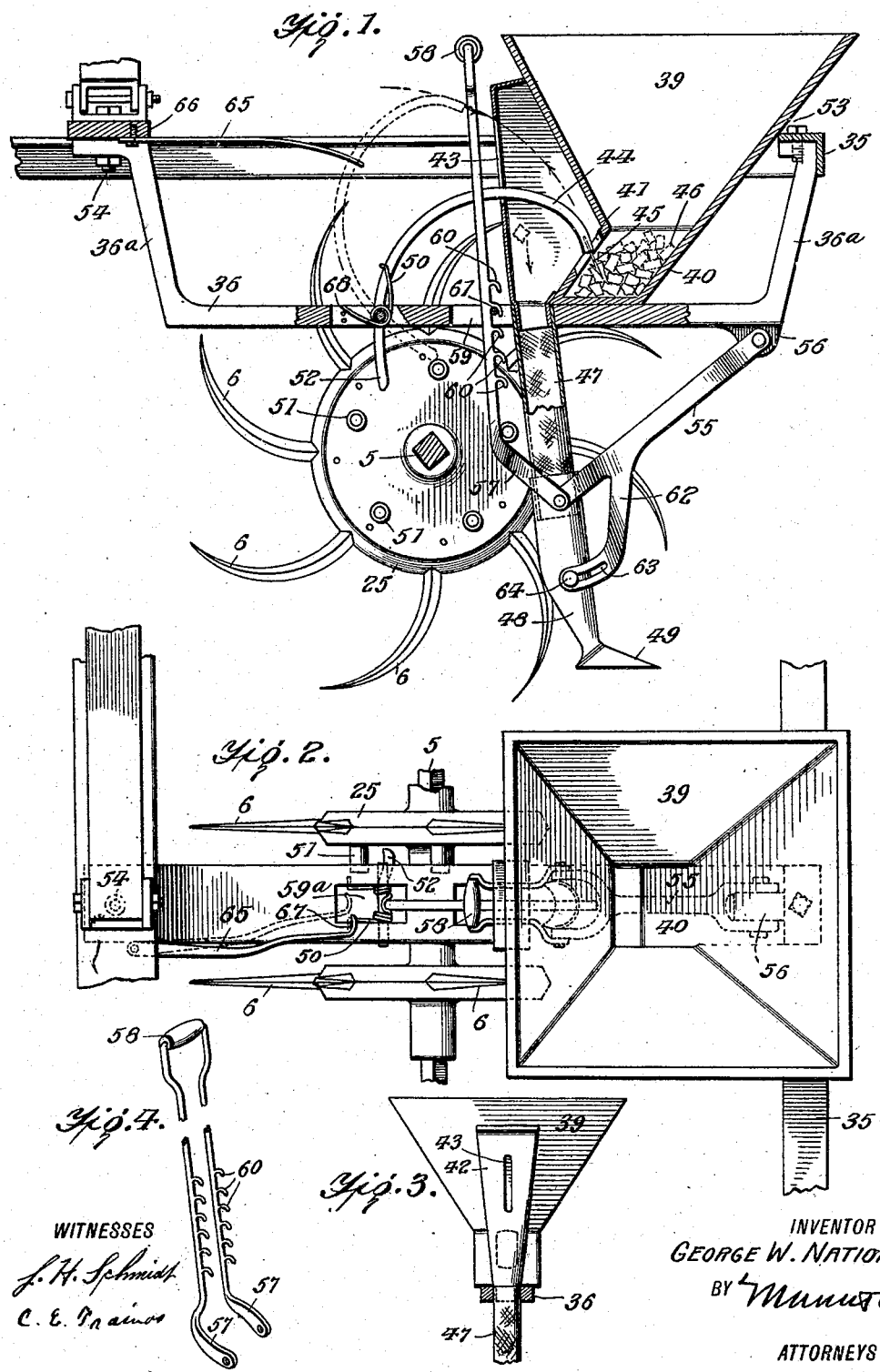

GEORGE W. NATION, OF ALLIANCE, NEBRASKA.

POTATO-PLANTER.

No. 930,877.  Specification of Letters Patent.  Patented Aug. 10, 1909.

Application filed December 11, 1908. Serial No. 466,979.

*To all whom it may concern:*

Be it known that I, GEORGE W. NATION, a citizen of the United States, and a resident of Alliance, in the county of Boxbutte and State of Nebraska, have invented certain new and useful Improvements in Potato-Planters, of which the following is a specification.

My invention is an improvement in potato planters, and consists of certain novel constructions and combinations of parts hereinafter described and claimed.

The object of the invention is to provide a potato planter attachment to be used in connection with my improved agricultural implement shown and described in my co-pending application Serial No. 466,978, filed Dec. 11, 1908.

Referring to the drawings forming a part hereof—Figure 1 is a partial transverse section of the planter; Fig. 2 is a plan view of Fig. 1; Fig. 3 is a rear view of the hopper and the chute, and Fig. 4 is a perspective view of the adjustable yoke.

The present embodiment of the invention comprises a hopper 39, having at the bottom thereof an inclined pocket 40, in whose rear face is a slit 41. A chute 42 is arranged behind the hopper, and covers the slit 41, the said slit forming a communication between the chute and the pocket. The chute is provided in its rear face with a slit 43 of lesser width than the slit 41 for a purpose to be presently described, and the lower end of the chute communicates by means of a hose 47 with a drilling shoe or furrow opener 48 provided with a plow point 49. The hopper is supported by a U-shaped bar or frame 36 whose arms 36ª are adapted to be connected with the framework 35 of the agricultural implement before mentioned, by means of bolts 53, the body portion of the frame depending below the said framework. The body portion of the bar 36 is of considerable width as shown by Fig. 2, and is provided with openings through one of which 59 passes the hose 47, and within the other 59ª is pivoted a curved arm 44, having its upper end provided with a spur 45. The curved arm is adapted to pass through the slit 43, and the slit 41 and to enter the pocket, whereby to engage a potato cut 46 and remove the same from the pocket when the arm is withdrawn. The arm is normally pressed toward the pocket by means of a spring 50 coiled around the pivotal mounting 67 thereof, one of the arms of the spring engaging the arm and the other a pin 68 in the opening. The slit 43 is of sufficient width to permit the passage of the arm, but not the passage of the potato cut, which is stripped from the spur by the sides of the slit, and the potato cut is permitted to drop through the hose 47 and the shoe 48 into the furrow.

The lower end 52 of the arm 44 is arranged in the path of a series of friction rollers 51 projecting laterally from a disk 25 secured to a shaft 5, which is supported by the framework 35, and when the framework is drawn forwardly the lower end of the arm will be engaged by a roller thus swinging the said arm out of the chute and dropping a potato cut into the furrow. As soon as the friction roller passes the end 52 of the arm the spring 50 immediately returns it into the pocket to engage another cut. The peripheral surfaces of the disks are provided with substantially radial spaced arms 6, which loosen the ground and cover the potato cuts deposited in the furrow.

An arm 65 is pivoted to the framework as at 66, and the forward end thereof is hooked as at 67, for engaging the curved arm 44 to retain it in the position shown in dotted lines in Fig. 1, when it is desired to restrain the operation of said arm for any reason.

The arm 55 has both of its ends forked, the one end being pivoted to a lug 56 at the front of the frame 36, and the arms of the fork at the other end are arranged on each side of the shoe, and are engaged by the arms of the vertically movable yoke or lever 57, which is provided with a grip 58, and is movable through the opening 59, in the plate 45 before mentioned. The arms of the lever are provided on one edge with a series of teeth 60 which are adapted to engage a pin 61 in the opening 59 whereby to retain the yoke in its adjusted position.

The arm 55 is provided with an angular portion 62, having a longitudinal slot 63, which is engaged by a pin on the shoe. It will be evident that by disengaging the teeth 60 from the pin 61, the shoe may be moved vertically by means of the lever 57, and may be secured in its adjusted position by engaging the teeth with the pin.

While I have shown the improved planter applied to my improved agricultural implement it is obvious that it might be supported in any suitable manner, the said support forming no part of the invention.

I claim:

1. In a device of the class described, a frame, a plurality of rotatable disks supported thereby and each provided with a series of radially projecting sickle shaped blades, a hopper supported by the frame, an arm having a spur movable into and out of the hopper, a spring acting normally to move the arm into the hopper, means in connection with one of the disks for moving the arm out of the hopper at predetermined intervals, means for stripping the spur, and a drilling shoe arranged to receive the material stripped from the spur.

2. In a device of the class described, a frame, a plurality of disks supported by the frame, and provided with radial digging blades, a hopper, a chute leading from the hopper, an arm provided with a spur movable through the chute and into the hopper, a spring acting normally to move the arm into the hopper, means in connection with one of the disks for moving the arm out of the hopper and the chute whereby to strip an article from the spur, and a drilling shoe in connection with the chute.

3. In a device of the class described, a plurality of disks provided with radial digging blades, a hopper, a chute leading from the hopper, a dropping arm, a spring acting to normally move the arm into the hopper, means in connection with one of the disks for moving the arm out of the hopper, and means for stripping an article from the arm.

GEORGE W. NATION.

Witnesses:
SOLON C. KEMON,
C. E. TRAINOR.